(No Model.)

F. J. BLANKE.
CAR COUPLING.

No. 256,277. Patented Apr. 11, 1882.

WITNESSES:
W. W. Hollingsworth
W. Read

INVENTOR:
F. J. Blanke
BY
ATTORNEYS.

UNITED STATES PATENT OFFICE.

FERDINAND J. BLANKE, OF WHITEWATER, WISCONSIN.

CAR-COUPLING.

SPECIFICATION forming part of Letters Patent No. 256,277, dated April 11, 1882.

Application filed January 5, 1882. (No model.)

*To all whom it may concern:*

Be it known that I, FERDINAND J. BLANKE, of Whitewater, in the county of Walworth and State of Wisconsin, have invented a new and Improved Car-Coupling; and I do hereby declare that the following is a full, clear, and exact description of the same, reference being had to the accompanying drawings, forming part of this specification, in which—

Figure 1:
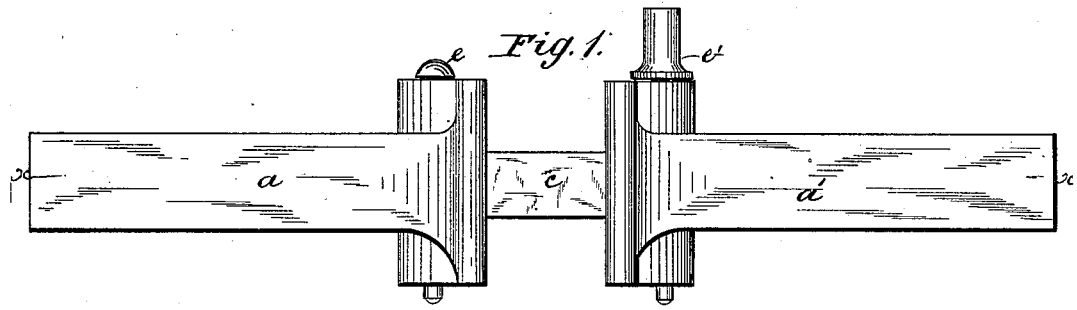
Figure 2:
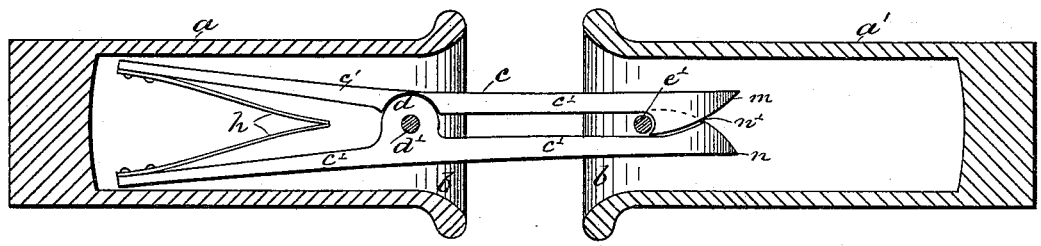
Figure 3:
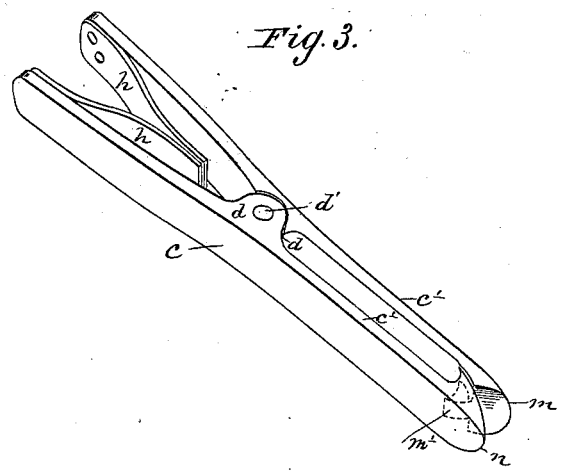

Figure 1 is a side view of my improved car-coupling. Fig. 2 is a horizontal section on line *x x*, Fig. 1. Fig. 3 is a perspective view of the coupling.

My invention relates to improvements in car-couplings; and it consists in the peculiar construction and arrangement of the parts, as hereinafter more fully set forth.

In the accompanying drawings, *a* represents the draw-bar of a car of the usual construction and having its opening *b* adapted to receive a link or clutch *c*. The link or clutch *c* is composed of two arms, *c' c'*, each having two circular central projections, *d*, provided with central holes, *d'*, through which an ordinary round coupling-pin, *e*, passes, thus pivoting at their centers or midway of their lengths the two arms *c' c'*, forming the link or clutch *c*. By this construction it will be seen that the round coupling *e* performs the double purpose of an ordinary coupling-pin for the cars and a joint-pin to pivot together the arms *c' c'* of the link or clutch *c*. To the rear end of each arm *c'* and to its inner face is secured a flat spring, *h*, the free ends of which springs bear against each other when the arms *c' c'* of the clutch are pivoted together and inserted in the opening in the draw-bar, the tension of the springs being exerted to throw apart the rear ends of the arms *c'* of the clutch and close or force together the front ends of the arms *c'*. The front end of each arm *c'* is formed in the shape of a half arrow-head, one of which heads, *m*, is provided with a projection, *m'*, adapted, when closed by the springs, to be forced into a corresponding recess, *n'*, in the half arrow-head *n* in the other arm. The rear faces of the half arrow-heads *m n* are curved so as to conform with the circular shape of the coupling-pin *e'* in draw-head *a'* with which it engages.

In practice, the clutch being inserted in the opening in the draw-bar and its arms pivotally secured together by a coupling-pin, *e*, passing through the holes in the circular projections made midway of the arms, a coupling-pin of the usual round construction is inserted in the usual holes in the draw-bar of the car to be coupled and the cars drawn together, when the front ends of the arms of the clutch will be opened by the coupling-pin of the car to be coupled coming in contact with the front ends of the arms of the clutch, and after the front ends of the arms of the clutch pass the coupling-pin they will be closed by the springs, thus securely coupling the cars.

By this construction it will be seen that a car may be coupled by inserting its coupling-pin and bringing up to it the car carrying the clutch, and that it may be uncoupled by simply drawing out its coupling-pin.

It will also be perceived that by drawing out the coupling-pin of the draw-head carrying the clutch the latter can readily be removed and shifted to the opposite end of the car when in the changes of cars two clutches lie opposite each other in their respective draw-heads.

I am aware that it is not new to couple cars by means of arms or jaws crossing and pivoted to each other and to one of the draw-heads by the same coupling-pin, and having the rear ends of the cross-arms connected together by toggle-joints, and a spring adapted to close the jaws and force them to sieze the coupling-pin of the opposite draw-head, and I therefore lay no claim broadly to such construction, my invention being confined to the construction pointed out in the claim, whereby I dispense entirely with the toggle-joints and other parts of the invention disclaimed, and render my construction much simpler, more effective, cheaper, and less liable to get out of order.

What I claim as my invention is—

The combination, with the draw-head *a'*, provided with the coupling-pin *e'*, of the draw-head *a*, arms *c' c'*, centrally pivoted together by the coupling-pin *e*, and provided with the half arrow-heads *m n*, the former having a projection, *m'*, and the latter a recess, *n'*, and the springs *h*, secured to the inner faces of the rear ends of the arms *c'*, and having their front ends bearing against each other, substantially as described, and for the purpose set forth.

FERDINAND J. BLANKE.

Witnesses:
SOLON C. KEMON,
CHAS. A. PETTIT.